United States Patent [19]

Domoto et al.

[11] Patent Number: 4,580,148

[45] Date of Patent: Apr. 1, 1986

[54] THERMAL INK JET PRINTER WITH DROPLET EJECTION BY BUBBLE COLLAPSE

[75] Inventors: Gerald A. Domoto; Aron Sereny, both of Briarcliff Manor, N.Y.

[73] Assignee: Xerox Corporation, Stamford, Conn.

[21] Appl. No.: 703,004

[22] Filed: Feb. 19, 1985

[51] Int. Cl.[4] .................... G01D 15/16

[52] U.S. Cl. .................... 346/140 R

[58] Field of Search .................... 346/140 R, 75

[56] References Cited

U.S. PATENT DOCUMENTS

| | | | |
|---|---|---|---|
| 4,251,824 | 2/1981 | Hara et al. | 346/140 R |
| 4,336,548 | 6/1982 | Matsumoto | 346/140 R |
| 4,339,762 | 7/1982 | Shirato et al. | 346/140 R |
| 4,410,899 | 10/1983 | Haruta et al. | 346/140 R |
| 4,463,359 | 7/1984 | Ayata et al. | 346/1.1 |
| 4,532,530 | 7/1985 | Hawkins | 346/140 |

OTHER PUBLICATIONS

IBM Tech. Disc. Bulletin, vol. 78, No. 4, Sep. 1975, to D. E. Fisher et al., "Ultrasonic Cavity Resonance for Ink-On-Demand Ink Jet Formation".

IEEE, in 1983 by S. Ichinose et al., "Solid-State Scanning Ink Jet Recording" Article.

IEEE Article by T. Agui et al. in IEEE Transactions on Electronic Devices, vol. ED-24, No. 3, Mar. 1977, "Drop Formation Characteristics of Electrostatic Ink Jet Using Water-Based Ink".

*Primary Examiner*—Joseph W. Hartary
*Attorney, Agent, or Firm*—Robert A. Chittum

[57] ABSTRACT

A thermal ink jet printhead ejects ink droplets on demand by utilizing the conservation of momentum of collapsing bubbles in a layer of liquid ink having a predetermined thickness. The printhead has an ink containing chamber with an array of individually addressable heating elements on one chamber interior surface which are aligned with an elongated opening in a parallel, confronting chamber wall. The spacing between the chamber wall with the elongated opening and the chamber surface with the heating elements provide the desired ink layer thickness. Selectively addressed heating elements momentarily produce vapor bubbles in the ink layer. When the bubbles collapse radially inward towards their respective heating elements, an oppositely directed force perpendicular to the heating element is generated which is large enough to overcome the surface tension of the ink in the elongated opening and propel a droplet of ink therefrom towards a recording medium.

6 Claims, 9 Drawing Figures

THERMAL INK JET PRINTER WITH DROPLET EJECTION BY BUBBLE COLLAPSE

BACKGROUND OF THE INVENTION

1. Field of the Invention

This invention relates to drop-on demand ink jet printing and more particularly to thermal ink jet printing wherein each ink droplet is ejected by conservation of momentum of a collapsing bubble of vaporized ink.

2. Description of the Prior Art

Ink jet printing systems are usually divided into two basic types, continuous stream and drop-on-demand. In continuous stream ink jet printing systems, ink is emitted in a continuous stream under pressure through one or more orifices or nozzles. The stream is perturbed, so that it is broken into droplets at determined, fixed distances from the nozzles. At the break-up point, the droplets are charged in accordance with varying magnitudes of voltages representative of digitized data signals. The charged droplets are propelled through a fixed electrostatic field which adjusts or deflects the trajectory of each droplet in order to direct it to a specific location on a recording medium, such as paper, or to a gutter for collection and recirculation. In drop-on-demand ink jet printing systems, a droplet is expelled from a nozzle directly to the recording medium along a substantially straight trajectory that is substantially perpendicular to the recording medium. The droplet expulsion is in response to digital information signals, and a droplet is not expelled unless it is to be placed on the recording medium. Drop-on-demand systems require no ink recovering gutter to collect and recirculate the ink and no charging or deflection electrodes to guide the droplets to their specific pixel locations on the recording medium. Thus, drop-on-demand systems are much simpler than the continuous stream type.

There are two basic propulsion techniques for the drop-on-demand ink jet printers. One uses a piezoelectric transducer to produce pressure pulses selectively to expel the droplets and the other technique uses thermal energy, usually the momentary heating of a resistor, to produce a vapor bubble in the ink, which during its growth expels a droplet. Either technique uses ink-filled channels which interconnect a nozzle and an ink-filled manifold. The pressure pulse may be generated anywhere in the channels or the manifold. However, the bubble generating resistor (hence the name bubble jet) must be located in each channel near the nozzle.

The thermal ink jet printers, sometimes referred to as bubble jet printers, are very powerful because they produce high velocity droplets and permit very close nozzles spacing for printing higher numbers of spots or pixels per inch on the recording medium. The higher the number of spots per inch, the better the printing resolution, thus yielding higher quality printing.

In thermal ink jet printers, printing signals representing binary digital information originate an electric current pulse of a predetermined time duration in a small resistor within each ink channel near the nozzle, causing the ink in the immediate vicinity to evaporate almost instantaneously and create a vapor bubble. The ink at the orifice is forced out as a propelled droplet by the bubble. At the termination of the current pulse, the bubble collapses and the process is ready to start all over again as soon as hydrodynamic motion or turbulence of the ink stops. The turbulence in the channel generally subsides in fractions of milliseconds so that thermally expelled droplets may be generated in the kilohertz range.

Existing thermal ink jet printers usually have a printhead mounted on a carriage which traverses back and forth across the width of a stepwise movable recording medium. The printhead generally comprises a vertical array of nozzles which confronts the recording medium. Ink-filled channels connect to an ink supply reservoir, so that as the ink in the vicinity of the nozzles is used, it is replaced from the reservoir. Small resistors in the channels near the nozzles are individually addressable by current pulses representative of digitized information or video signals, so that each droplet expelled and propelled to the recording medium prints a picture element or pixel.

In U.S. Pat. No. 4,463,359, a thermal ink jet printer is disclosed having one or more ink-filled channels which are replenished by capillary action. A meniscus is formed at each nozzle to prevent ink from weeping therefrom. A resistor or heater is located in each channel at a predetermined distance from the nozzles. Current pulses representative of data signals are applied to the resistors to momentarily vaporize the ink in contact therewith and form a bubble for each current pulse. Ink droplets are expelled from each nozzle by the growth of the bubbles which causes a quantity of ink to bulge from the nozzle and break off into a droplet at the beginning of the bubble collapse. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium such as paper. The current pulses are shaped to prevent the meniscus at the nozzles from breaking up and receding too far into the channels, after each droplet is expelled. Various embodiments of linear arrays of thermal ink jet devices are shown, such as those having staggered linear arrays attached to the top and bottom of a heat sinking substrate and those having different colored inks for multicolored printing. In one embodiment, a resistor is located in the center of a relatively short channel having nozzles at both ends thereof. Another passageway is connected to the open-ended channel and is perpendicular thereto to form a T-shaped structure. Ink is replenished to the open-ended channel from the passageway by capillary action. Thus, when a bubble is formed in the open-ended channel, two different recording mediums may be printed simultaneously.

IBM Technical Disclosure Bulletin, Vol. 18, No. 4, September 1975 to Fisher et al discloses an ink-on-demand ink jet printer in which jet formation is triggered ultrasonically and the ink reservoir is an ultrasonic cavity which enhances the ultrasonic effects on the meniscus at the orifice. A high-voltage electrode having an orifice therein and an acceleration electrode sandwich the printing medium. A voltage on the order of 2–4 kilovolts is applied to the electrode with the orifice and a voltage of about 7 kilovolts is applied to the acceleration electrode. The voltage from the electrode with the orifice causes a meniscus to be formed at the ink reservoir orifice. When it is desired to expel a droplet, resonant frequency is applied to piezoelectric crystal forming part of the ink reservoir. The combined electrostatic and hydrostatic forces on the ink, when not at resonance, are not sufficient to cause leakage of the ink or formation of the droplet which travels through the electrode orifice and impinges on the printing medium.

U.S. Pat. No. 4,251,824 to Hara et al discloses a thermally activated liquid ink jet recording method which involves driving one or a group of heaters to produce vapor bubbles in ink-filled channels of a printhead which expel ink droplets. In FIGS. 7A and 7B, a single resistor is used for each channel to expel drops from nozzles thereof. A plurality of resistors in each channel are shown in FIG. 12 which are sequentially driven to expel droplets. In FIG. 2C, simultaneous driving of varying quantities of resistors in each channel expels droplets of varying diameters.

U.S. Pat. No. 4,410,899 to Haruta et al discloses a method of forming ink droplets by a heat generator which forms bubbles to expel the droplets, but the bubbles do not fill the channels, so that the ink is not totally separated from the nozzle even when the bubbles reach their maximum size.

U.S. Pat. No. 4,336,548 to Matsumoto discloses a thermal ink jet printing device in which the surface of the heat generating section is made to have a surface coarseness of from 0.05S to 2S measured in accordance with the Japanese Industrial Standard JIS-B-0601.

U.S. Pat. No. 4,339,762 to Shirato et al discloses a thermal ink jet recording method wherein the heat generating element has a construction which provides that the degree of heat generated is different from position to position along the heating surface of the heat generating element and the strengthen of the input signal to the heat generating element is controlled, thereby controlling the distribution of degree of heat supplied to the ink at the heating surface in order to achieve gradation of an image to be recorded.

An article entitled "Solid-State Scanning Ink Jet Recording" by Ichinose et al, IEEE, 1983 discloses an ink jet recording head with one slit-like opening through which a plurality of ink jet streams may be produced one stream for each of a linear array of individually addressable recording electrodes. The ink stream is emitted from the slit-like opening due to the electrically addressed recording electrode and a counter electrode located behind the recording medium. The ink stream strikes the recording medium and forms a printed dot or pixel thereon.

An article entitled "Drop Formation Characteristics of Electrostatic Ink jet Using Water-Based Ink" by Agui et al, IEEE Transactions on Electron Devices, Vol. ED-24, No. 3, March 1977, pages 262–266, discloses droplet formation characteristics of electrostatic ink jets using water-based ink. Ink droplets are generated by the balance between surface tension forces and the electrostatic attractive force at the tip of a nozzle produced by an acceleration electrode. Experimental results obtained by varying the applied voltage to the acceleration electrode and the pressure of the ink in a nozzle bearing capillary tube are reported.

SUMMARY OF THE INVENTION

It is the object of the invention to use the conservation of momentum of collapsing vapor bubbles in a layer of liquid ink having a predetermined thickness to produce moving droplets of ink on demand.

It is another object of this invention to form momentary bubbles contacting individually addressable heating elements underlying a layer of liquid having a predetermined thickness by selectively applying current pulses representative of digitized data signals to the heating elements, so that, upon collapse of each bubble, a droplet is ejected from the ink layer toward a movable recording medium in a direction perpendicular to the heating element and ink layer through a force generated by the conservation of momentum of the collapsing bubble.

It is still another object of the invention to use an elongated opening through which the droplets are ejected instead of individual nozzles.

It is yet another object of this invention to combine an electrostatic force with the thermally induced fluid motion of a droplet produced through the conservation of momentum of a collapsing bubble to provide guidance and directional stability to the ejected droplet during its flight to a recording medium.

In accordance with the present invention, a thermal ink jet printhead comprises a housing having an internal chamber for containing a layer of liquid ink under a predetermined pressure and having a predetermined thickness. The housing has one wall with an elongated opening or slit therein. The wall is parallel to and spaced from a movable recording medium. A linear array of individually addressable heating elements are formed on the interior surface of another wall of the housing chamber which is parallel to the wall with the elongated opening. The linear array of heating elements confront and are aligned with the elongated opening. The mutually parallel walls with the heating elements and the elongated opening are separated by a distance equal to the desired ink layer thickness in order to maintain the ink layer thickness during printhead operation. The housing chamber is filled with ink at a predetermined pressure and the ink is replenished as it is used from an ink supply cartridge integral therewith or from a separate supply via flexible hose. The printhead may be either adapted for mounting on a reciprocable carriage for printing contiguous swaths of information one swath at a time to produce complete pages of information or adapted for printing a single row of pixels across the entire width of the moving recording medium to print complete pages of information one line of pixels at a time from a fixed printhead. In the carriage configuration, the recording medium is held stationary during the carriage traversal in one direction and then stepped a distance of one swath height before the carriage reverses direction and moves in the opposite direction by a stepper motor.

Each heating element is selectively addressed by a current pulse representative of digitized data signals to form a vapor bubble in the ink contacting the heating element. The collapse of the bubble produces a force vector directed towards the heating element and perpendicular thereto. By conservation of momentum, an equal and opposite force overcomes the surface tension at the meniscus formed at the elongated opening and ejects a quantity of ink therefrom in the form of a moving droplet. Each droplet ejected results in a slight local thinning of the ink layer at the meniscus which rapidly refills.

In an alternate embodiment, a backing electrode contacts the recording medium surface opposite the one receiving the droplets and is aligned and parallel with the elongated opening and heating elements of the printhead to produce an electrostatic force which provides guidance and directional stability to the ejected droplet during its flight to the recording medium.

DESCRIPTION OF THE PREFERRED EMBODIMENT

Figure 1:
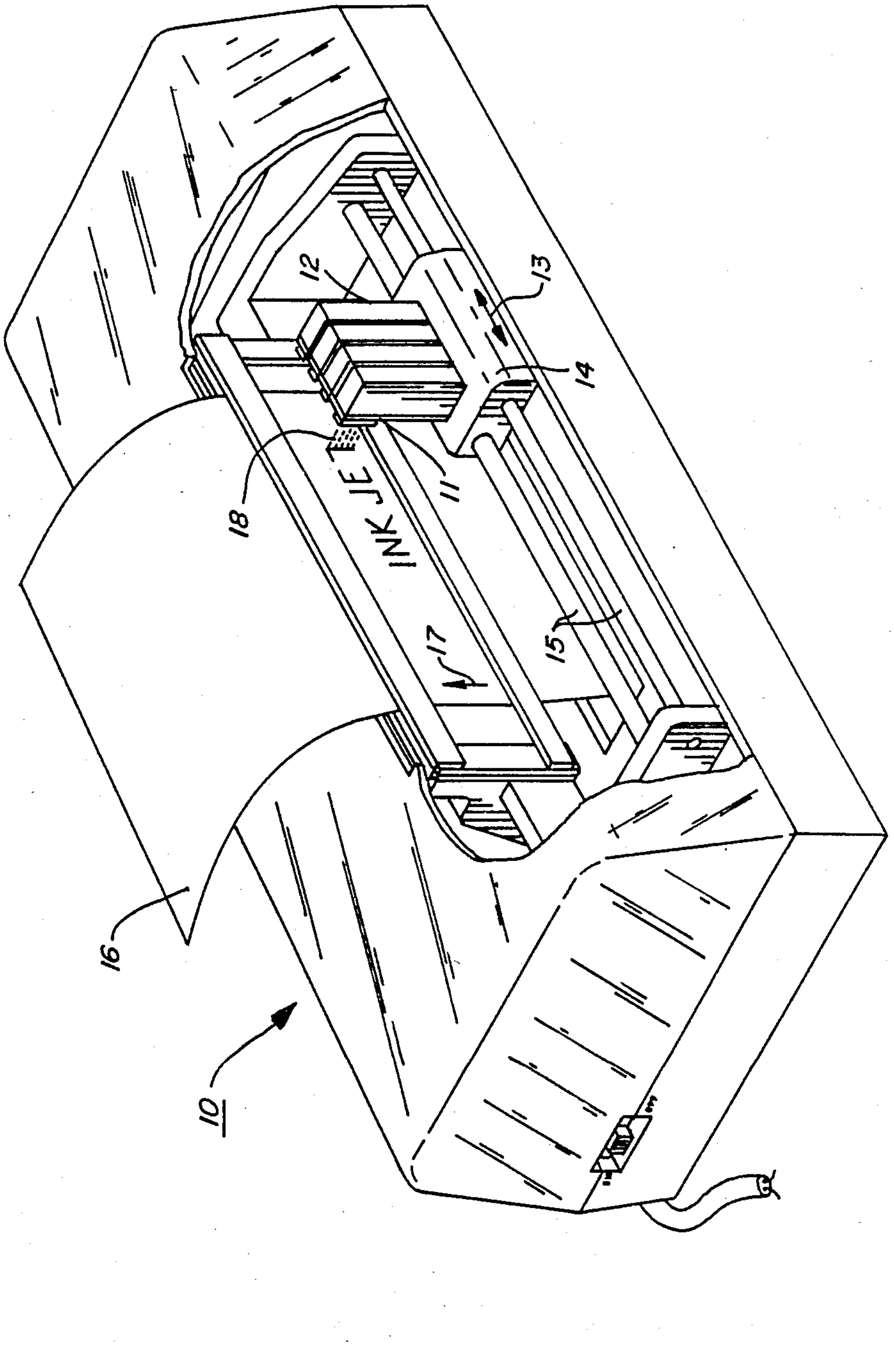
FIG. 1 is a schematic perspective view of a multicolor, thermal ink jet printer having a plurality of disposable ink cartridges, each with integral printheads which form the present invention, mounted on a movable carriage therein.

Referring to FIG. 1, a multicolor thermal ink jet printer 10 is shown. Several disposable ink supply cartridges 12, each with an integrally attached thermal printhead 11 which form the subject matter of the present invention, are removably mounted on a translatable carriage 14. During a printing mode, the carriage reciprocates back and forth on guide rails 15 parallel to the recording medium 16 as depicted by arrow 13. The recording medium, such as, for example, paper, is held stationary while the carriage is moving in one direction and, prior to the carriage moving in a reverse direction, the recording medium 16 is stepped a distance equal to the height of the swath or stripe of data printed on the recording medium by the thermal printheads 11 during one traversal in one direction across the recording medium. As explained more fully later, each printhead has an elongated opening or slit parallel with the direction of stepping by the recording medium shown by arrow 17 and perpendicular to the reciprocating carriage direction 13 through which ink droplets 18 are ejected and propelled to the recording medium. The elongated opening or slit 19, shown in FIG. 2, confronts and is spaced from the recording medium a distance of between 0.01 and 0.1 inch. In the preferred embodiment, this distance is about 0.02 inch. The thermal printhead propels ink droplets 18 toward the recording medium 16 whenever droplets are required, during the traverse of the carriage 14 to print information. As explained later, a linear series of droplets are ejectable from the slit, so that the standard typewriter alphanumeric characters may be completely printed during one traverse of the carriage. However, the stepping tolerance for the recording medium and lineal deviation of the printhead are held within acceptable limits to permit contiguous swaths of information to be printed without unsightly gaps or overlaps, thus enabling the printing of graphical or pictorial information as well as alphanumerics.

Each cartridge 12 contains a different colored ink; one may be black and one to three additional cartridges may contain different selected colored inks. Such an arrangement permits black and white printing, color highlighting of basic black and white prints, or multiple colored prints. For multicolored printing, cyan, magenta, and yellow colored inks would normally be used. Other combinations of cartridge colors could be used depending upon the user's needs, such as, for example, two or three cartridges containing black ink and one or two cartridges containing red ink. Of course, a single disposable cartridge 12 may be installed and used in the thermal ink jet printer 10, if single colored printing is desired.

Each cartridge 12 and printhead 11 combination is removed and discarded after the ink supply in the cartridge has been depleted. This eliminates the need to refill the cartridge or replace the printheads that have lifetimes of about than $10^7$ droplet firings per printhead heating element. Each disposable cartridge and printhead is capable of printing about 50–100 pages of data per cartridge.

Figure 2:
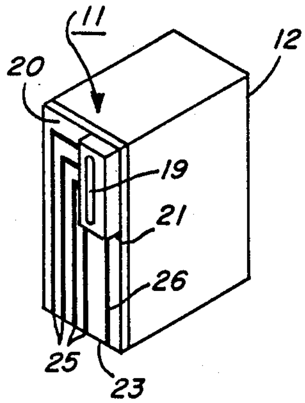
FIG. 2 is a schematic perspective view of a disposable ink cartridge showing the integral printhead with an elongated opening through which droplets are ejected.

In FIG. 2, planar insulative substrate 20 is attached to the cartridge 12 and contains a linear series of heating elements or resistors 24 (see FIGS. 3 and 4) aligned with the slit 19 in recessed, insulative structure 21. Any insulative material may be used for the substrate 20 or structure 21 such as, for example, silicon. A pattern of electrodes 25 and common return 26 terminate at one edge 23. A receptacle (not shown) in the carriage 14 releasably receives and holds the cartridges. Each terminal end of the electrodes 25 and the terminal end of the common return 26 are automatically placed in contact with circuitry in the carriage and printer which enables selective addressing of each heating element with a current pulse representative of digitized data signals.

Figure 3:
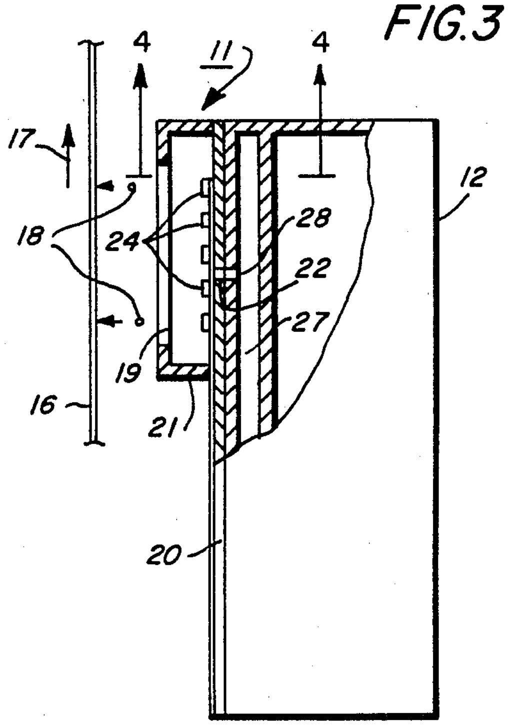
FIG. 3 is a partially sectioned side view of the cartridge and integral printhead of FIG. 2 showing droplet trajectories to the recording medium.
Figure 4:
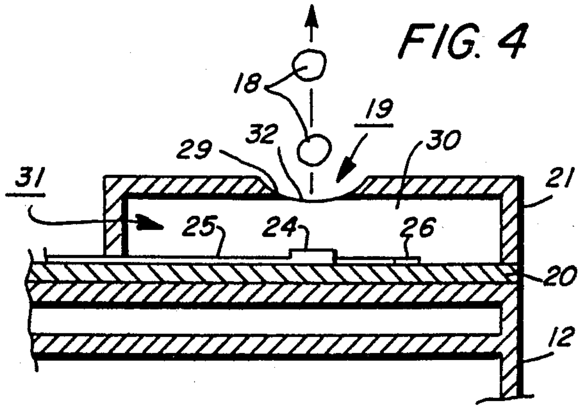
FIG. 4 is a cross-sectional view of the printhead as viewed by the cross-section "4—4" indicated in FIG. 3.

The partially cross-sectioned end view of the cartridge 12 and printhead 11 show in FIG. 3 that recessed structure 21 is sealingly attached to planar substrate 20 with the slit 19 aligned with the heating elements 24. The slit and the array of heating elements are parallel to the recording medium 16. The cartridge has a passageway 27 which restricts the flow of ink from the main ink supply and has an aperture 28 therein concentrically aligned with an aperture 22. The interfaces between the apertures are sealed to prevent leakage of ink therefrom by any well known means such as by an adhesive. The cross-section along the line marked "4—4" in FIG. 3 is shown in enlarged form as FIG. 4. Note that the longitudinal edges 29 of slit 19 are sloped outwardly from the liquid ink 30 to form confronting knife edges, spaced from each other between 0.5 and 1.0 mm, depending upon ink layer thickness and heating element size. In the preferred embodiment, the knife edge separation is 0.8 mm, the heating element size is 130 μm by 160 μm, and the layer thickness is 75 μm.

A printhead manifold 31 is formed by the permanent mounting of the recessed structure 21 on planar substrate 20 with its slit 19 aligned with the linear array of heating elements 24. The ink in the printhead manifold and the cartridge is maintained at a slightly negative pressure of 1 to 10 inches of water to prevent the meniscus 32 formed in the slit 19 from weeping ink therefrom. The wall of the recessed structure 21 containing the slit 19 is substantially parallel with the confronting surface of the planar substrate and the distance therebetween is selected for efficient droplet ejection without ingesting air through the slit or causing undue fluid dynamic action of the ink which would delay ejection of a subsequent droplet. One of the primary purposes of the slit with the knife edges is to assist in dampening the agitated ink after droplet ejection and to maintain a uniform ink layer thickness.

Figure 9:
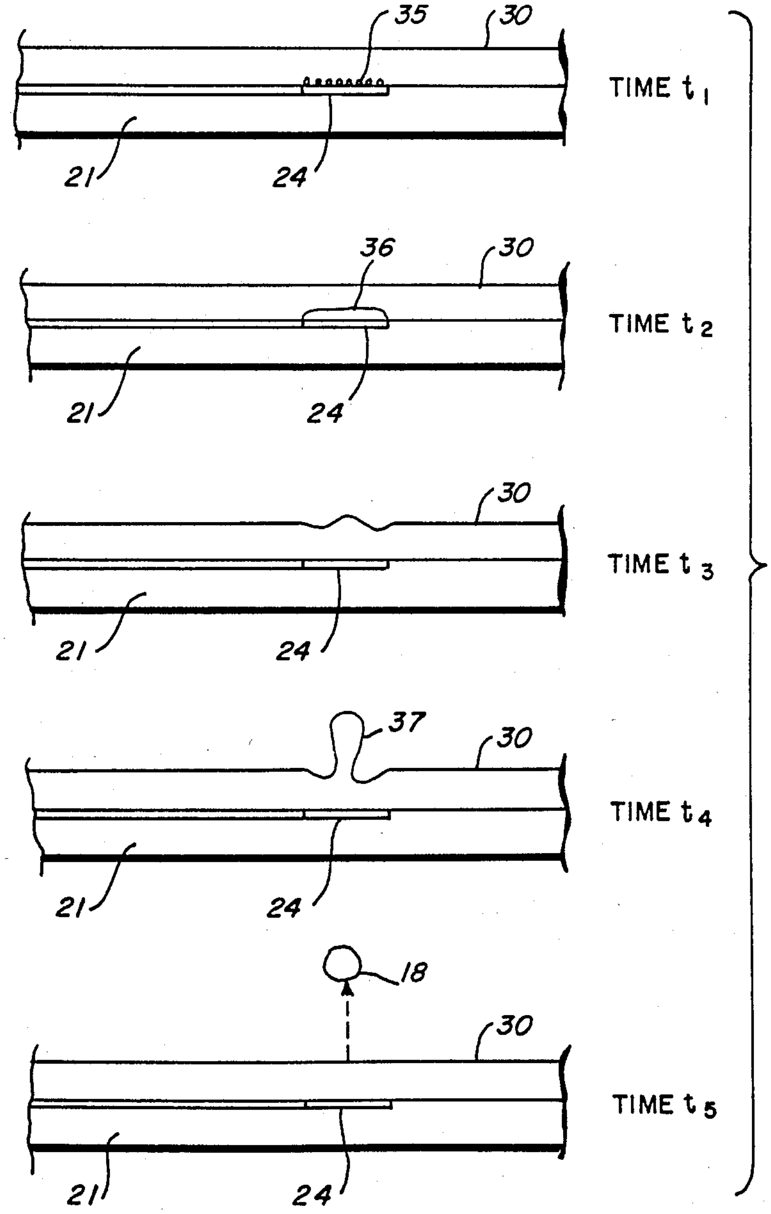
FIG. 9 is a diagrammatic cross-sectional view of a one of the heating elements of the printhead incorporating the present invention showing bubble growth, bubble collapse, and droplet formation and subsequent ejection at various instantaneous times.

The droplet ejection mechanics used may be explained with referenced to FIG. 9 where various stages of bubble growth, bubble collapse and droplet ejection are shown at certain instantaneous times after a current pulse has been applied to a heating element. Each schematic view is a cross-section of the planar substrate 20 with the recessed structure 21 removed for clarity. Heating element 24 formed on the surface of the planar substrate is covered by a layer of ink 30. A current pulse is passing through the heating element at line t1 and mini-bubbles 35 have been generated which will later grow to one large flatten bubble 36. At time t2, the current pulse has passed and the bubble has reached its maximum growth. Time t3 depicts the total collapse of the bubble 36 and the rebounding force from the heating element generated by the conservation of momentum therefrom which is acting on the layer of ink directly over the heating element in a direction perpendicular thereto. A jet-like formation 37 of a quantity of ink is formed and accelerated in a direction away from the heating element at time t4. The accelerated quantity of ink in the jet-like formation 37 overcomes the surface tension of the layer of ink and is ejected from the ink layer as a droplet 18 at time t5.

Once the proper thickness of ink is established over the heating elements, an electrical pulse of proper power level and duration applied to the heating element produces a relatively flat bubble on the surface of the heating element. This bubble grows and reaches a maximum size shortly after the expiration of the electrical pulse and then the bubble collapses. The subambient pressure produced in the vapor bubble due to condensation causes collapse as well as fluid velocity in the liquid ink layer which is directed radially inward of the collapsing bubble and toward the heating element. Conservation of momentum of the radially inward fluid flow requires jet formation in a direction perpendicular to the solid heating element surface. With proper energy input and liquid ink layer thickness, the velocity of the jet-like formation is sufficiently large to overcome the surface tension and single droplet on demand is ejected from the ink layer. Each droplet ejection results in a slight local thinning of the ink layer which rapidly refills. Fortunately, the small rapidly dampened surface disturbances which are created do not adversely affect neighboring heating element/droplet formation locations.

In one experimental demonstration, a commercially available thermal printhead from the Rohm Corporation, sold under the designation KH 653A, was used covered by a layer of water based, dyeless ink to eject droplets therefrom. The configuration used employed knife-edge controlled capillary ink layers to obtain the proper liquid ink film thickness. Droplet size typically obtained was 150 μm when the heating elements were addressed with voltage pulses of 17 volts at pulse rates of up to 200 hertz (Hz). The heating element sizes were 130 μm by 160 μm and their resistance was about 73.5 ohm. The voltage pulse duration was 275 microseconds. The ink layer thickness was 75 μm (micrometers) and the knife edge separation was 0.8 mm (millimeters). Excellent results were obtained and the droplet trajectories were uniformly straight.

Figure 5:
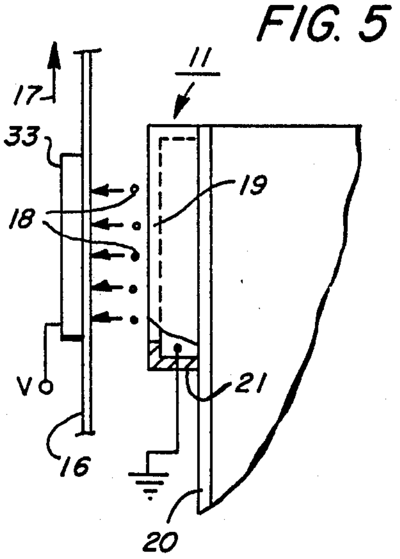
FIG. 5 is a partially sectioned portion of a side view of an alternate embodiment of the cartridge and integral printhead of FIG. 3 wherein a biasing electrode is placed behind the recording medium.

An alternate embodiment of the configuration depicted in FIGS. 1 through 4 is shown in FIG. 5, where a backing electrode 33 is placed behind and in contact with the recording medium 16. A direct current (d.c.) biasing voltage in the range of 200 to 500 volts is applied to the backing electrode and the liquid ink is grounded. The electrostatic forces acting on the induced charge at the ink surface or meniscus in the slit 19 tend to assist droplet formation as well as provide guidance and directional stability to the ejected droplets 18. An alternating current (a.c.) biasing voltage may also be used having large voltage amplitudes set just below the threshold of electrostatic attraction of ink from the slit in the recessed structure 21. Droplets are still ejected thermally by selectively addressing the heating elements with a current pulse representing digitized data signals. However, lower thermal energy requirements for droplet ejection is provided, resulting in a longer life for the heating elements and, therefore, a longer operating lifetime for the printheads.

Figure 6:
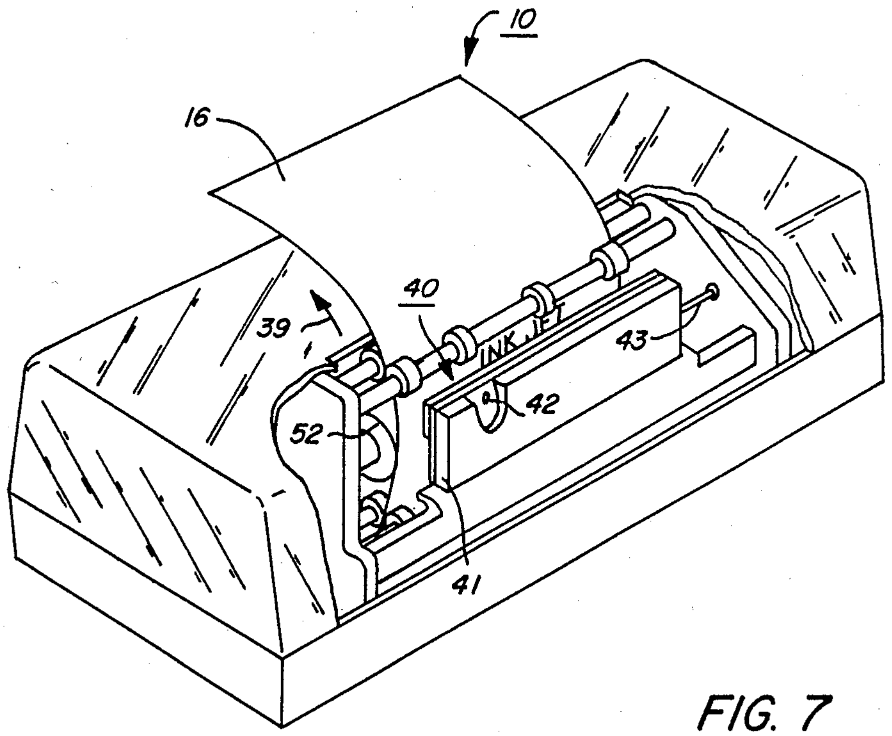
FIG. 6 is a schematic perspective view of another embodiment of a thermal ink jet printer having a fixed printhead incorporating the present invention which extends transversely across the full width of a moving recording medium for printing pages of information one line of pixels at a time.

Another embodiment of the present invention is shown in FIG. 6 wherein a fixed, pagewidth printhead 40 is used which may be permanently attached to a disposable ink supply cartridge 41 or it may be releasably attached to a fixed cartridge. In either case, the passageways 42 between the printhead and cartridge must be sealed against leakage. If the cartridge is fixed to the printer 10, then an ink replenishment hose 43 is used to maintain the ink level therein from an ink supply (not shown) which may be contained elsewhere within the printer.

The operation and construction of the alternate embodiment in FIG. 6 is substantially the same as that of the embodiment depicted in FIGS. 1 through 4, except the slit 44 (see FIG. 7) extends the full width of the recording medium and is perpendicular to the recording medium's direction of movement, as indicated by arrow 39, rather than parallel to the recording medium's direction of movement indicated by arrow 17 in FIG. 1.

During the printing mode, the recording medium 16 is continually moved at a constant speed and complete rows of picture elements or pixels are printed as the recording mdium moves passed the fixed printhead. Each droplet which is ejected and propelled into the recording medium represents a printed pixel. Thus, complete pages of information are printed by the embodiment of FIG. 6 one row or line of pixels at a time.

As in the previous embodiment, the printhead 40 comprises a flat insulative member 47 on which a single row of a plurality of heating elements 50 are formed that are individually addressable by current pulses via electrodes 45 and common return 46. A recessed, insulative rectangular body 48 is sealingly and permanently attached thereto. One wall 51 of the rectangular body has the slit 44 which spaced from and aligned with the heating elements 50 (see FIG. 8). The insulative member 47 and insulative rectangular body 48 may be any electrically insulative material such as a ceramic or silicon. A predetermined layer of ink 30 is maintained between the rectangular body wall 51 and the flat member 47. The ink layer is replenished as it is consumed during the printing mode through passageway 42 that is concentrically aligned with a similar sized opening (not shown) in the cartridge 41. A rotatable cylindrical platen 52 is mounted behind the recording medium and in contact therewith. The platen is parallel with the printhead slit 44 and provides solid support for the recording medium at the time and location of droplet impact.

Figure 7:
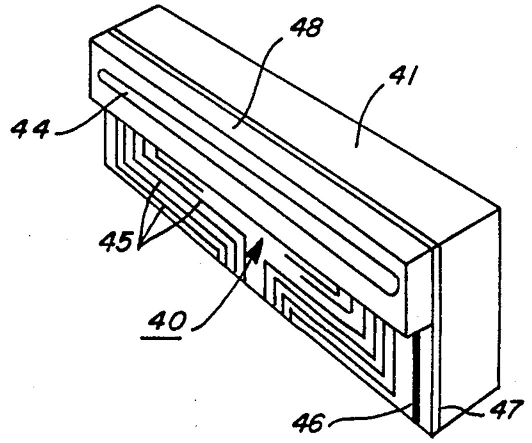
FIG. 7 is a schematic perspective view of the ink cartridge showing the integral, page-width printhead of FIG. 6 with the elongated opening in the printhead oriented perpendicular to the direction of movement of the recording medium.
Figure 8:
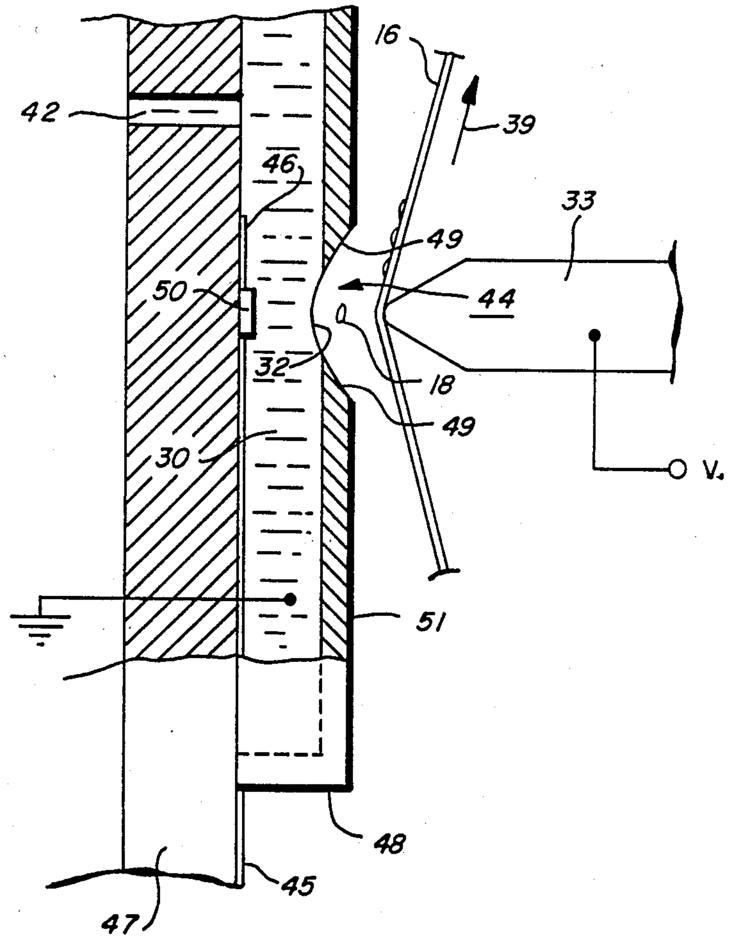
FIG. 8 is an enlarged, cross-sectional side view of the printhead of FIG. 6 further incorporating a biasing electrode behind the recording medium.

In FIG. 8, an alternate embodiment of that shown in FIGS. 6 and 7 is depicted, wherein the platen 52 is replaced with a biasing electrode 33 and the layer of ink 30 is grounded. The confronting elongated edges of the slit 44 are sloped to form knife edges 49 to keep the menisucs 32 at the surface of the ink layer. As in the embodiment of FIG. 5, the biasing electrode produces an electrostatic field which provides guidance and directional stability to the ejected droplet 18. The biasing electrode may, of course, have either a d.c. or a.c. voltage applied to it.

In recapitulation, the thermal ink jet printhead of the subject invention comprises a predetermined layer of ink maintained over a linear array of electrodes which are individually addressable with current pulses representative of digitized data signals. A knife-edged slit is aligned with the electrodes to maintain the meniscus at the surface of the ink layer and to maintain the desired ink layer thickness over the electrodes. Bubbles are produced in the ink layer contacting the selectively addressed electrodes. After the current pulses have passed the bubbles collapse and, through conservation of momentum, generate a force in a direction away from and perpendicular to the heating elements that overcome the surface tension of the ink in the slit and ejects a quantity of ink therefrom as a droplet hurled toward a recording medium. Each droplet impinging on the recording medium represents a printed pixel. The slit and aligned heating elements may be mounted in a printhead adapted for reciprocation in a carriage type printer where the printhead traverses across a stationary recording medium to print swaths of information. The recording medium is stepped a distance of one printed swath as the carriage changes direction of movement. Alternatively, the printhead may be fixed relative to the printer. In the fixed embodiment, the slit and linear array of heating element extend the full width of the recording medium which moves thereby at a constant speed. The reciprocating printhead prints swaths of information on a stationary recording medium which is stepped between each swath and the fixed printhead prints one complete row of pixels at a time as a constantly moving recording medium. Either embodiment may further incorporate a backing electrode behind the recording medium which produces an electrostatic field to provide guidance and directional stability to the ejected droplets.

Many modifications and variations are apparent from the foregoing description of the invention and all such modifications and variations are intended to be within the scope of the present invention.

We claim:

1. An ink jet printhead for use in a thermal ink jet printer to direct ink droplets on demand toward a movable recording medium comprising:

an ink manifold for holding and maintaining a layer of ink having a predetermined thickness, the manifold having an elongated opening therein which confronts the recording medium and is spaced therefrom a predetermined distance, the width of the manifold opening being a dimension which causes a meniscus to be formed therein by the ink so that weeping of ink therefrom is prevented;

a linear array of heating elements being formed on an internal surface of the manifold opposite the manifold opening, the heating element array being parallel to and aligned with said manifold opening;

electrode means for directing current pulses to each individual heating element;

means for selectively energizing each heating element by addressing the electrode means with current pulses of predetermined duration representative of digitized data signals, so that the ink contacting the heating elements is momentarily vaporized to form a vapor bubble; and upon collapse of each bubble, a fluid velocity in the ink layer is directed toward the heating elements and, through conservation of momentum, a quantity of ink is directed away from and in a direction substantially perpendicular to the heating element with a velocity sufficiently large to overcome the ink surface tension at the meniscus in the manifold opening, so that the quantity of ink is ejected therethrough as a droplet propelled toward the recording medium.

2. The ink jet printhead of claim 1, wherein means for replenishing the ink in the manifold is provided.

3. The ink jet printhead of claim 1 wherein the printhead is fixed relative to the printer; and wherein the manifold opening and array of heating elements extend across the full width of the recording medium in a direction parallel to a confronting surface of the recording medium and in a direction perpendicular to the direction of movement thereof, so that complete pages of information may be printed one line of pixels at a time.

4. The ink jet printhead of claim 3, wherein an elongated, biasing electrode is placed in contact with the surface of the recording medium opposite to the one having the droplets printed thereon, the biasing electrode being parallel to the manifold opening and aligned therewith.

5. The ink jet printhead of claim 1, wherein the printhead is mounted on ink supply cartridges, the ink supply cartridges being mountable on a reciprocating carriage of the printer, the reciprocating direction of the carriage being perpendicular to the direction of periodic movement of the recording medium by the printer; wherein the linear array of heating elements and the manifold opening are parallel to the direction of periodic movement of the recording medium and perpendicular to the reciprocating direction of the carriage, so that swaths of information may be printed during the carriage traversal in each reciprocating direction; and wherein the recording medium is stationary while the carriage is moved in one direction and is stepped a distance of one swath height each time the carriage reverses direction so that complete pages of information is printed one swath at a time.

6. The ink jet printhead of claim 5, wherein a biasing electrode is placed in contact with the surface of the recording medium opposite to the one having the droplets impacting thereon, the biasing electrode being parallel to the manifold opening and aligned therewith.

* * * * *